(12) United States Patent
Alstin et al.

(10) Patent No.: US 9,937,439 B2
(45) Date of Patent: Apr. 10, 2018

(54) SOLVENT EXTRACTION APPARATUS

(71) Applicant: Foss Analytical AB, Hilleroed (DK)

(72) Inventors: Finn Alstin, Lerberget (SE); Thomas Palm, Jonstorp (SE)

(73) Assignee: Foss Analytical AB, Hilleroed (DK)

( * ) Notice: Subject to any disclaimer, the term of this patent is extended or adjusted under 35 U.S.C. 154(b) by 352 days.

(21) Appl. No.: 14/765,825

(22) PCT Filed: Feb. 5, 2013

(86) PCT No.: PCT/EP2013/052208
§ 371 (c)(1),
(2) Date: Aug. 4, 2015

(87) PCT Pub. No.: WO2014/121814
PCT Pub. Date: Aug. 14, 2014

(65) Prior Publication Data
US 2015/0367250 A1    Dec. 24, 2015

(51) Int. Cl.
  *B01D 11/02* (2006.01)
  *B01D 5/00* (2006.01)
  *B01D 11/00* (2006.01)

(52) U.S. Cl.
  CPC .......... *B01D 11/0296* (2013.01); *B01D 5/009* (2013.01); *B01D 5/0051* (2013.01); *B01D 5/0063* (2013.01); *B01D 11/0219* (2013.01); *B01D 2011/007* (2013.01)

(58) Field of Classification Search
  CPC ... B01D 5/009; B01D 5/0063; B01D 11/0296
  See application file for complete search history.

(56) References Cited

U.S. PATENT DOCUMENTS 4,562,016 A * 12/1985 Colliver ............... F24F 6/04
                                                    134/186
5,961,787 A * 10/1999 Persson ............ B01D 11/0219
                                                    202/168
(Continued)

FOREIGN PATENT DOCUMENTS

DE        29602854 U1      7/1996
DE     102008046889 A1 *   4/2010
WO      WO-9700109 A1      1/1997

OTHER PUBLICATIONS

DE102008046889A1 Eng.*

(Continued)

*Primary Examiner* — Jonathan Miller
*Assistant Examiner* — Gabriel E Gitman
(74) *Attorney, Agent, or Firm* — Harness, Dickey & Pierce, P.L.C.

(57) ABSTRACT

A solvent extraction apparatus comprises a cooler for condensing solvent vapor and a funnel provided towards its lower end. The funnel has an upper surface at which terminates a central downwards directed elongate outlet having an internal exit port formed in a side wall. A vertically movable lifting rod passes through the cooler and the outlet. A section of the lifting rod is shaped to delimit a passage-way for condensate while simultaneously sealing the port. A liquid guide is provided at the upper surface to preferentially direct flow of condensate towards the passage-way.

20 Claims, 4 Drawing Sheets

(56) References Cited

U.S. PATENT DOCUMENTS

| | | | | |
|---|---|---|---|---|
| 7,686,188 B2 * | 3/2010 | Stebick | ............... | B65D 47/122 |
| | | | | 222/109 |
| 2012/0145710 A1 * | 6/2012 | Corbett | ................. | B65D 77/06 |
| | | | | 220/9.4 |

OTHER PUBLICATIONS

Periphery. (n.d.) In Merriam Webster Online, Retrieved Aug. 10, 2017, from https://www.merriam-webster.com/dictionary/periphery.*

International Search Report PCT/ISA/210 for International Application No. PCT/IB2013/052208 dated Sep. 30, 2013.

* cited by examiner

SOLVENT EXTRACTION APPARATUS

CROSS-REFERENCE TO RELATED APPLICATIONS

This is a National Phase Application of PCT/EP2013/052208, filed Feb. 5, 2013.

The present invention relates to a solvent extraction apparatus of the solvent reflux type and particularly to an apparatus configured for use in the Soxhlet-type extraction process.

One such solvent extraction apparatus is disclosed in U.S. Pat. No. 5,961,787, the entire content of which is incorporated herein by reference. This extraction apparatus comprises a co-linear vertical arrangement of a cooler for condensing solvent vapour in fluid tight connection with a lower boiling vessel for containing solvent and a sample holder, such as an extraction thimble. The cooler is formed with an internal funnel shaped lower portion having a central downwards directed outlet for conveying condensed solvent vapour, an inner wall portion of which outlet is provided with a port through which condensed solvent vapour (or 'condensate') may be removed from the extraction device. This funnel shaped lower portion is also provided with peripheral through holes for conveying solvent vapour into the cooler. The extraction thimble is mechanically couplable with a lower end of a lifting rod which itself is arranged to pass within the cooler along the vertical direction. The lifting rod is movable through the cooler to effect vertical movement of the extraction thimble and is configured towards its lower end with a first section which is shaped, for example by means of bevelling or fluting, such that condensed solvent can flow in a passage-way formed between the rod and an adjacent inner wall portion of the central, downwards directed outlet, whilst the remaining part of this shaped section closes the port against ingress of condensate. Below the first section the lifting rod is configured with a second section which is shaped, for example by bevelling, fluting or by forming a neck, to permit condensed solvent to flow into the port. Below this second section the rod is formed with a sealing member for sealing against the downwards directed outlet of the funnel shaped lower portion of the cooler when the rod is positioned such that the second section is located to permit egress of condensed solvent through the port. Thus it will be appreciated that the lifting rod acts as a valve, the movement of which in the vertical direction can regulate the flow of condensed solvent into and out of the cooler.

A problem with this known apparatus is that the valve typically does not fully seal the port and leakage into the port may occur when the rod is positioned with its first section located in the outlet with the intention to seal the port against such ingress.

It is an aim of the present invention to alleviate this problem to reduce the leakage past the valve and into the port.

Accordingly there is provided a solvent extraction apparatus comprising a sample holder; a boiling vessel for containing a solvent; a cooler for condensing solvent vapour located in fluid tight connection with and vertically above the boiling vessel, the cooler being provided with a funnel towards a lower end in the direction of the boiling vessel having an upper surface for receiving solvent condensate, the funnel being provided with a central downwards directed elongate outlet for conveying the solvent condensate from the upper surface, the outlet comprising a first inner wall portion in which a port is formed; and a vertically movable lifting rod passing through the cooler and the central downwards elongate outlet and being connectable at a lower end to the sample holder, the lifting rod formed with a first section towards the lower end shaped to define, with the rod in a first position, a passage-way for condensate in cooperation with a second inner wall portion of the downwards directed outlet as well as to define a seal to simultaneously seal the port against ingress of solvent condensate. The funnel is provided with a liquid guide at its upper surface configured to provide a preferential liquid flow direction for the condensate towards the passage-way and away from the first inner wall portion in which the port is formed. Deflecting condensate away from the port reduces leakage past the port.

In one embodiment the liquid guide comprises a raised lip located on the upper surface of the funnel about a portion of the periphery of the central downwards directed elongate outlet. The lip may be open to fluid, possibly by means of through holes, in a region corresponding with and generally above the second inner wall portion so that condensate may flow freely along the passage-way.

In a further embodiment the liquid guide comprises a groove in the upper surface of the funnel about at least a portion of the periphery of the central downwards directed elongate outlet. The groove may be formed with a varying depth to provide a preferential flow direction for condensate into the passage-way. In an embodiment of the present invention the floor of the groove is inclined towards the passage-way in order to achieve this.

Specific embodiments of the present invention will be further described with reference to the accompanying figures, of which:

Figure 1:
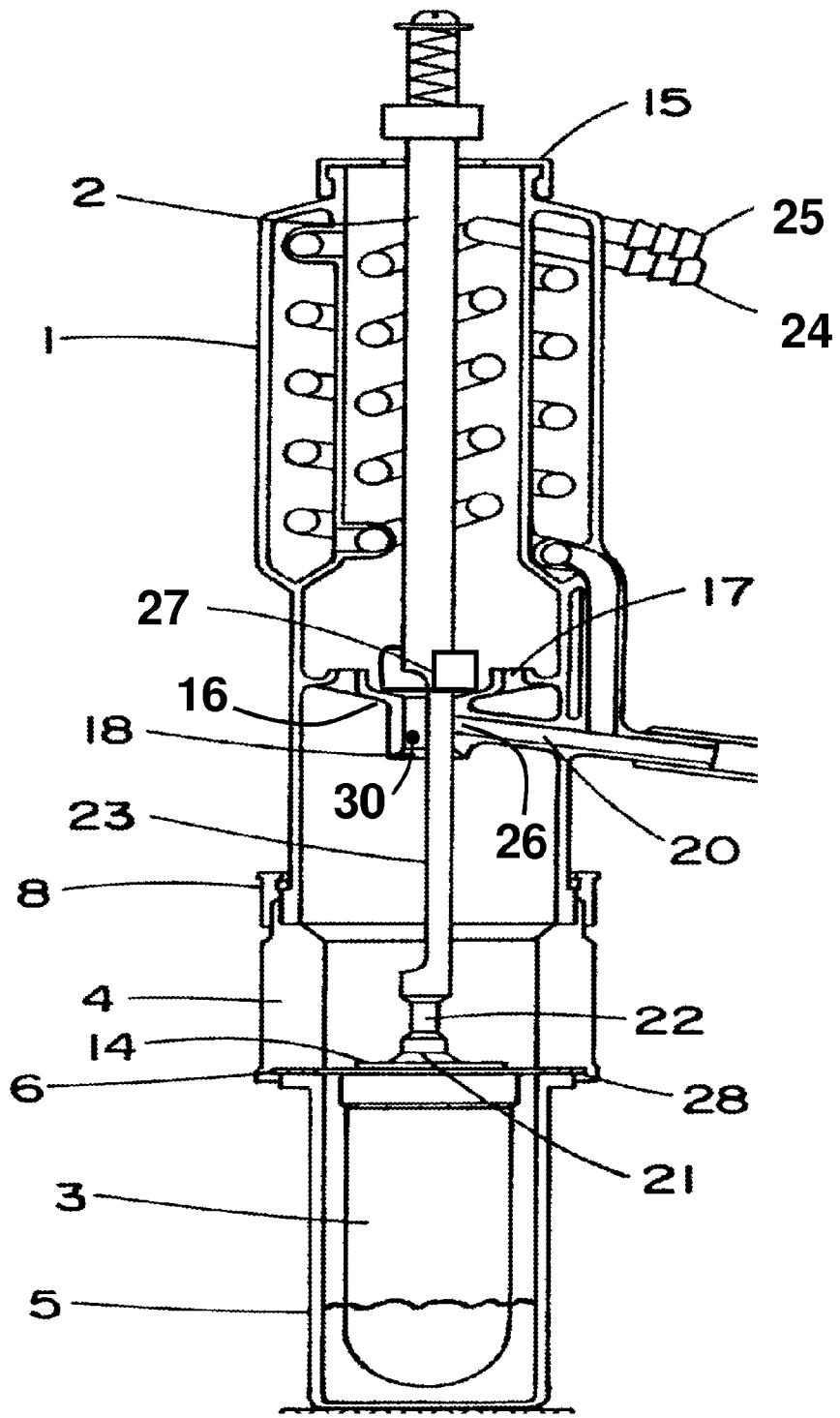
FIG. 1 shows a solvent extraction apparatus according to the present invention.

Considering now FIG. 1, the solvent extraction apparatus comprises a boiling vessel 5 for solvent, an extraction thimble 3 for a sample to be extracted and a cooler 1 for condensing evaporated solvent vapours. The cooler 1 is connected to the boiling vessel 5 via an adaptor 4. To this end, the adaptor 4 is provided at a lower end with guide ring 6 which has a seal 28 by which the boiling vessel 5 is attached to the connector 4 in a fluid tight seal. A lifting rod 2 passes through the cooler 1. The rod 2 has a round cross section and it is in its lower part provided with a drip rim 14 with through holes. The thimble 3 is detachably fixed to the drip rim 14. The holes are intended for passage of condensed solvent. The thimble 3 can be moved vertically by means of the lifting rod 2.

In the present embodiment, the adaptor 4 can be attached to the lower part of the cooler 1 for example by means of a mechanical joint such as a cooler nut coupling 8. According to another alternative a clamping ring arranged on the upper part of the adaptor 4 can be clamped over an outwards directed bead on the cooler 1.

The upper part of the boiling vessel 5 tightens against the lower part of the adaptor 4.

Thus, in the present embodiment the cooler 1, the adaptor 4 and the boiling vessel 5 are firmly fixed together, but can of course easily be separated. In other embodiments the adaptor 4 may be excluded.

The cooler 1 is here provided with a nipple 25, via which nipple 25 cooling water may be supplied, and a nipple 24, via which nipple 24 the supplied cooling water may be removed. The upper part of the cooler 1 is sealed by means of a lid or the like 15 which embraces the lifting rod 2 and the upper part of the cooler 1. In this way little or no solvent can escape. The cooler 1 is provided with a funnel, here in the form of a funnel 16. The funnel 16 is provided with through going holes 17 for departing solvent vapours and with a central downwards directed elongate outlet 18 for condensed solvent vapours. This funnel 16 may, in certain embodiments, be a separate element which may be attached towards the bottom of the cooler 1, either removably or permanently. According to the present invention the funnel 16 is also provided with a liquid guide 27 which will be described in greater detail below with reference to FIGS. 2 to 6.

Internal the outlet 18 there is provided an outlet port 26 connected to one end of a branch conduit 20 for the transport of condensate out of the apparatus. The outlet 18 has the same inner diameter as the diameter of the lifting rod 2 at a matching lower section of the lifting rod 2. This section the lifting rod 2 is formed in part with a bevelled portion 23.

Thereby in use, at a first boiling step and a subsequent vapour condensate extraction step the lifting rod 2 is moved vertically to a first position such that condensed solvent can flow out of the cooler via at least one conduit 30 formed between the bevelled part 23 and the adjacent inner wall of the outlet 18 and then through the holes in the drip rim 14 to the thimble 3. At these steps the port 26 is sealed by means of the remaining non-bevelled part of this section of the lifting rod 2 which acts as a side-valve having a sealing surface portion to seal against the passage of condensate through the port 26 and into the branch conduit 20.

Below this partially bevelled part 23 the lifting rod of the present embodiment has a section 22 with a smaller diameter than the main part of the lifting rod 2. The lifting rod 2 is below the section 22 provided with a sealing part 21 which in use is intended at second position, equivalent to full elevation, of the lifting rod 2 to seal against the lower part of the outlet 18 and form a kind of bottom-valve at a third recovery step and at an optional fourth drying step when condensed solvent can pass from the upper side of the funnel 16 between the section 22 of the lifting rod 2 and the inner wall of the outlet 18 out of the apparatus via port 26 and the branch conduit 20 towards, for example, a collecting vessel (not shown).

The section 22 has such a length that an open connection is obtained between the upper surface of the funnel 16 and the branch conduit 20 when the lifting rod is at its full elevation in the second position.

Figure 2:
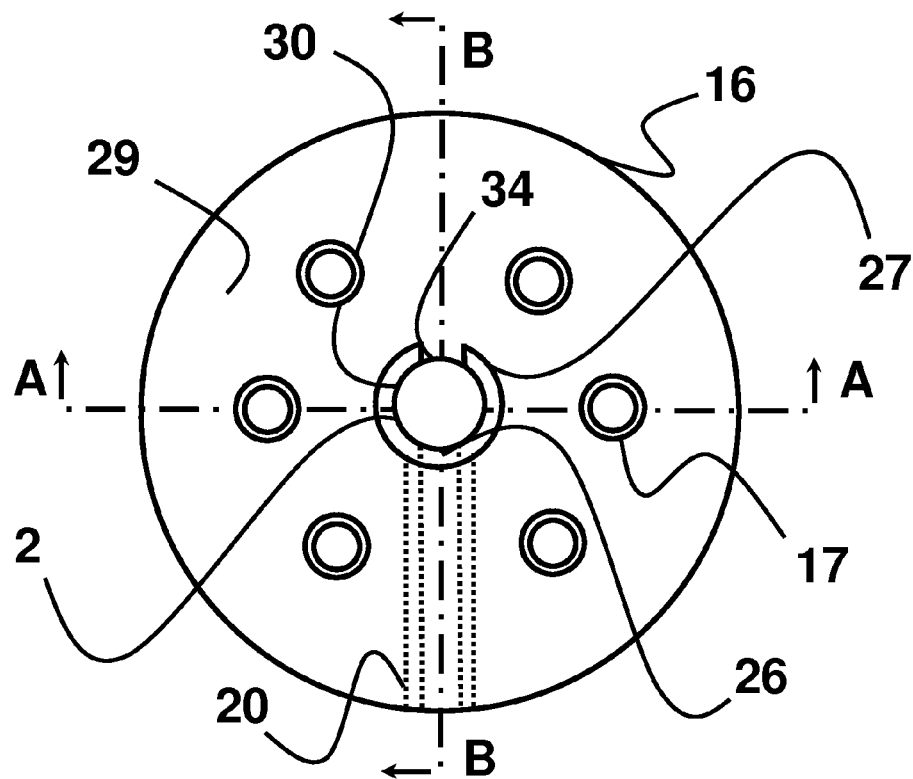
FIG. 2 shows a plan view of an embodiment of the funnel shaped means according to the present invention usable in the apparatus of FIG. 1.
Figure 3:
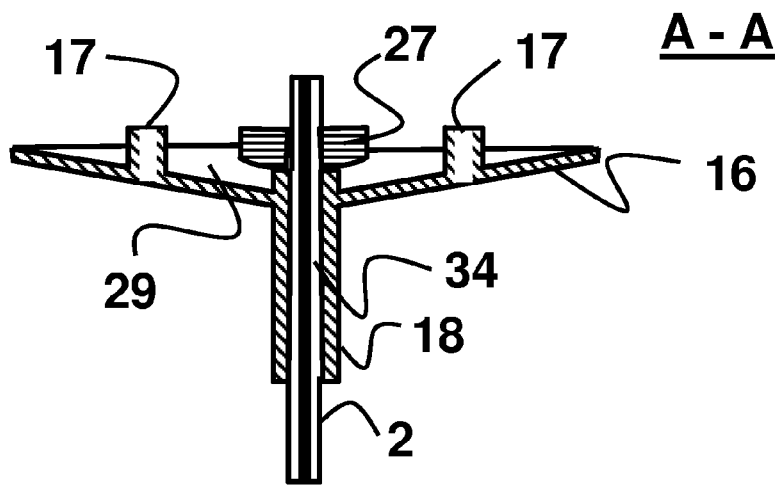
FIG. 3 shows a cross-section along the lines A-A of FIG. 2.
Figure 4:
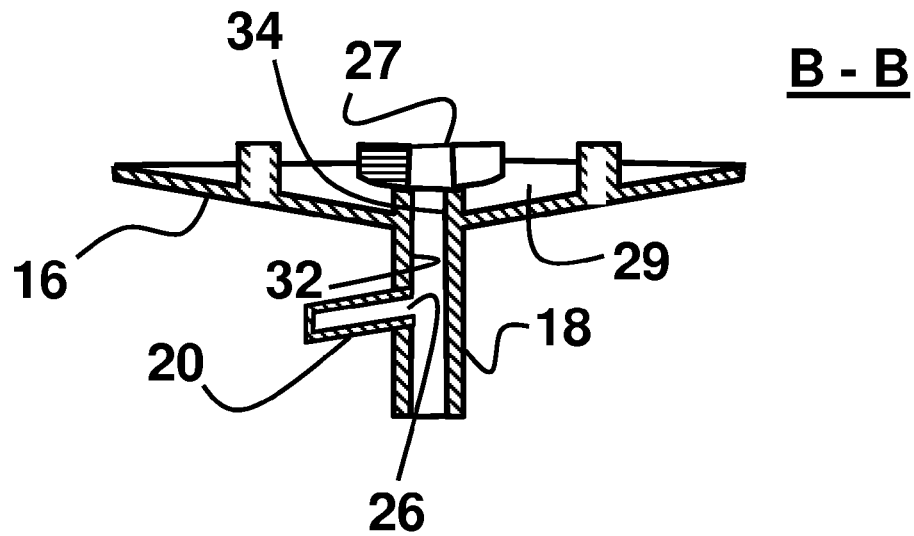
FIG. 4 shows a cross-section along the lines B-B of FIG. 2.

Considering now an embodiment of the funnel 16 illustrated in FIGS. 2 to 4 which may be employed in the embodiment of the solvent extraction apparatus which is illustrated in FIG. 1. The funnel 16 is provided with an upper surface 29 which slopes towards the elongate outlet 18 and may be of a generally concave construction.

The outlet 18 terminates at the upper surface 29 and has a cross-section dimension substantially that of the lifting rod 2 which has a sidling fit within the outlet 18. The outlet 18 has a first inner surface portion 32 in which is formed the outlet port 26 and a second inner surface portion 34 which will form at least one (here illustrated as two in the present embodiment) flow conduit 30 in cooperation with the bevelled portion 23 of the lifting rod 2 when in the rod 2 is at its first position.

Raised (relative to the upper surface 29) through holes 17 are provided around the periphery of the upper surface 29 to allow for passage of solvent vapour into the cooler 1.

The liquid guide 27 is located about the outlet 18 at the upper surface 29 of the funnel 16. This guide 27 is configured to guide condensate on the upper surface 29 preferentially towards the second inner surface 34 which forms conduit(s) 30 for flow of condensate out of the cooler 1 and towards the thimble 3. In this manner the guide 27 acts to divert condensate away from the first inner surface 32 and thereby reduce the leakage of condensate into the port 26.

In the present embodiment the liquid guide 27 is in the form of a raised (relative to the upper surface 29) lip extending around the outlet 18, at least in the region corresponding with and being generally above the first inner surface 32. In the embodiment of the funnel 16 which is illustrated in FIGS. 2 to 4 this lip 27 is generally 'C' shaped having an opening in correspondence with the termination of the conduits 30 at the upper surface 29, generally above the second inner wall portion 34 of the elongate outlet 18.

Figure 5:
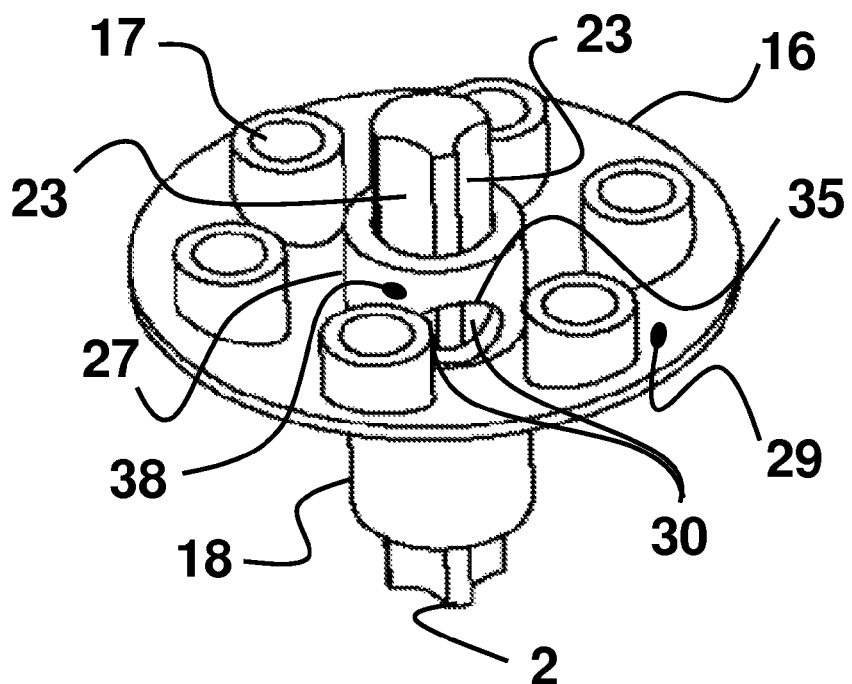
FIG. 5 shows a second embodiment of the funnel according to the present invention.

In a second embodiment of the funnel 16 which is illustrated in FIG. 5 the liquid guide 27 is again in the form of a raised lip which here extends completely about the outlet 18 at the upper surface 29. Raised through holes 17 (here six shown) are also provided at the upper surface 29 for the through flow of solvent vapour. Also illustrated is the lifting rod 2 in its first position which rod 2, in the present embodiment, is provided with two bevelled portions 23 that when in this position cooperate with the second inner wall portion (not shown) of the outlet 18 to form flow conduits 30 for flow condensate out of the funnel 16.

A side-wall 38 of the lip 27 is provided with one or more holes 35 that in use will correspond with the bevelled portion(s) 23 of the lifting rod 2 and are thus located generally above the second inner wall portion (not shown) of the outlet 18. These holes 35 are intended, in use, to provide a preferential passage of condensate from the upper surface 29 of the funnel 16 into the flow conduit(s) 30 and away from the branch conduit (not shown).

Figure 6:
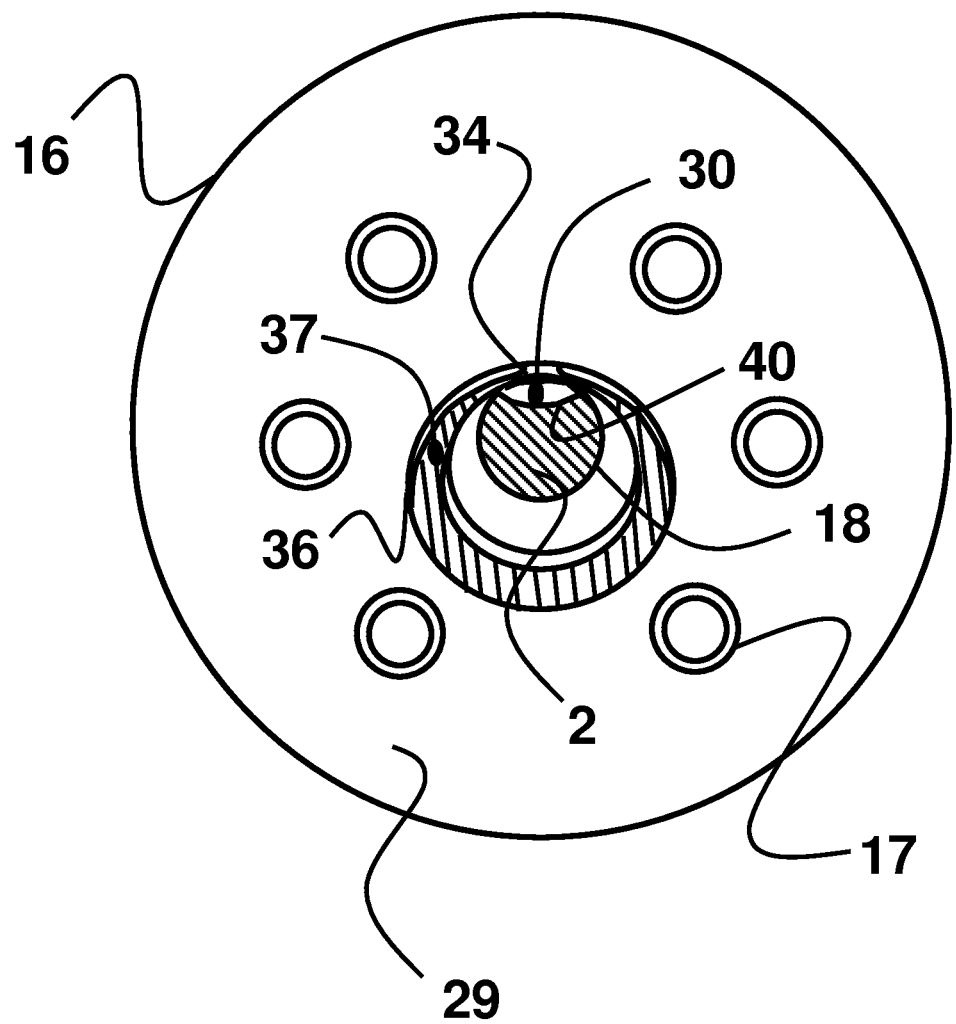
FIG. 6 shows a third embodiment of a funnel according to the present invention.

In a third embodiment of the funnel 16 which is illustrated in FIG. 6 the liquid guide is provided as a groove 36 in the upper surface 29 of the funnel 16, here extending around substantially all of the outlet 18. The groove 36 has a floor 37 which is sloped to provide a preferential liquid flow direction in the groove 36 towards the second inner wall portion 34. Thus, according to the embodiment of FIG. 6, the groove 36 becomes deeper a direction towards the second inner wall portion 34. In the present embodiment the lifting rod 2 is provided with a single bevel 40 which in use is intended to cooperate with the second inner wall portion 34 to form the passageway 30 for condensate.

The invention claimed is:

1. A cooler for condensing solvent vapour, the cooler comprising:
    an upper surface configured to receive solvent condensate;
    an elongated outlet extending downwards from a first end at the upper surface, the outlet being configured to drain the solvent condensate from the upper surface through the first end of the outlet, the outlet including an inner surface, the inner surface having first and second portions, the first inner surface portion including a port, the first end of the outlet including a periphery, the periphery of the first end including a periphery of the first inner surface portion and a periphery of the second inner surface portion; and a liquid guide on the first end, the liquid guide being configured to restrict solvent condensate to entering the outlet at the periphery of the second inner surface portion.

2. A solvent extraction apparatus, comprising:
a sample holder;
a boiling vessel configured to contain a solvent;
the cooler according to claim 1, the cooler configured to condense solvent vapor in fluid connection with the boiling vessel; and
a vertically movable lifting rod extending through the cooler and the outlet, the lifting rod including,
a first section configured to
extend through a limited portion of the outlet bounded by the first inner surface portion if the lifting rod is in a first position such that the first section and the second inner surface portion collectively define a flow conduit through the outlet, the flow conduit being isolated from the first inner surface portion, and
seal the port against ingress of solvent condensate.

3. The solvent extraction apparatus as claimed in claim 2, wherein
the liquid guide includes a raised lip extending along at least a portion of the periphery of the first end.

4. The solvent extraction apparatus as claimed in claim 3, wherein
the raised lip extends along the periphery of the first inner surface portion, and
the raised lip is restricted from extending along the periphery of the second inner surface portion.

5. The solvent extraction apparatus as claimed in claim 3, wherein the raised lip extends along at least a majority of the periphery of the first end.

6. The solvent extraction apparatus as claimed in claim 3, wherein
the raised lip encloses the periphery of the first end, and
the raised lip includes at least one through hole, the at least one through hole extending through a portion of the raised lip at the periphery of the second inner surface portion.

7. The solvent extraction apparatus as claimed in claim 2, wherein
the liquid guide includes a groove in the upper surface, the groove extending along at least a portion of the periphery of the first end.

8. The solvent extraction apparatus as claimed in claim 7, wherein
the groove includes a sloped floor, the floor configured to direct solvent condensate on the upper surface towards the periphery of the second inner surface portion.

9. The solvent extraction apparatus as claimed in claim 8, wherein
the groove extends along the periphery of the second inner surface portion and at least a portion of the first inner surface portion; and
a slope of a floor of the groove is proportional with proximity to the second inner surface portion.

10. The solvent extraction apparatus as claimed in claim 7, wherein the groove extends along an entirety of the periphery of the first end.

11. The solvent extraction apparatus as claimed in claim 2, wherein
the first section includes at least one beveled portion, the beveled portion extending along a longitudinal axis of the lifting rod.

12. The solvent extraction apparatus as claimed in claim 11, wherein the first section includes a plurality of bevelled portions, each of the bevelled portions configured to at least partially define a separate flow conduit through the outlet if the lifting rod is in the first position.

13. The solvent extraction apparatus as claimed in claim 12, wherein
the liquid guide includes a raised lip enclosing the periphery of the first end; and
the raised lip includes a plurality of through holes, each of the through holes configured to direct solvent condensate into separate flow conduits.

14. The cooler as claimed in claim 1, wherein the liquid guide includes a raised lip extending along at least a portion of the periphery of the first end.

15. The cooler as claimed in claim 14, wherein
the raised lip extends along the periphery of the first inner surface portion; and
the raised lip is restricted from extending along the periphery of the second inner surface portion.

16. The cooler as claimed in claim 14, wherein the raised lip extends along at least a majority of the periphery of the first end.

17. The cooler as claimed in claim 14, wherein
the raised lip encloses the periphery of the first end, and
the raised lip includes at least one hole, the at least one hole extending through a portion of the raised lip at the periphery of the second inner surface portion.

18. The cooler as claimed in claim 1, wherein the liquid guide includes a groove in the upper surface, the groove extending along at least a portion of a periphery of the first end.

19. The cooler as claimed in claim 18, wherein the groove includes a sloped floor, the floor configured to direct solvent condensate on the upper surface towards the periphery of the second inner surface portion.

20. The cooler as claimed in claim 19, wherein
the groove extends along the periphery of the second inner surface portion and at least a portion of the first inner surface portion; and
a slope of a floor of the groove is proportional with proximity to the second inner surface portion.

* * * * *